United States Patent
McNair

(10) Patent No.: US 11,232,207 B2
(45) Date of Patent: Jan. 25, 2022

(54) DECENTRALIZED TRUST ASSESSMENT

(71) Applicant: Bell Helicopter Textron Inc., Fort Worth, TX (US)

(72) Inventor: Michael Kevin McNair, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 562 days.

(21) Appl. No.: 16/149,042

(22) Filed: Oct. 1, 2018

(65) Prior Publication Data

US 2020/0104502 A1     Apr. 2, 2020

(51) Int. Cl.
    *G06F 21/00*     (2013.01)
    *G06F 21/57*     (2013.01)
    *G06N 3/08*     (2006.01)

(52) U.S. Cl.
    CPC ............ *G06F 21/57* (2013.01); *G06N 3/08* (2013.01); *G06F 2221/031* (2013.01); *G06F 2221/032* (2013.01)

(58) Field of Classification Search
None
See application file for complete search history.

(56) References Cited

U.S. PATENT DOCUMENTS

| | | | |
|---|---|---|---|
| 2017/0312614 A1* | 11/2017 | Tran | A61B 5/11 |
| 2019/0042867 A1* | 2/2019 | Chen | G06N 5/022 |
| 2019/0171822 A1* | 6/2019 | Sjouwerman | G06F 30/20 |
| 2019/0171934 A1* | 6/2019 | Sites | G06N 3/08 |
| 2019/0173919 A1* | 6/2019 | Irimie | G06N 3/082 |

OTHER PUBLICATIONS

Loukas, George et al. Cloud-Based Cyber-Physical Intrusion Detection for Vehicles Using Deep Learning. IEEE Access, vol. 6. https://ieeexplore.ieee.org/stamp/stamp.jsp?tp=&arnumber=8171725 (Year: 2017).*

Hasan, Raqibul; Taha, Tarek M. On-chip static vs. dynamic routing for feed forward neural networks on multicore neuromorphic architectures. 2013 2nd International Conference on Advances in Electrical Engineering (ICAEE). https://ieeexplore.ieee.org/stamp/stamp.jsp?tp=&arnumber=6750358 (Year: 2013).*

* cited by examiner

*Primary Examiner* — Jeremiah L Avery
(74) *Attorney, Agent, or Firm* — Lightfoot & Alford PLLC

(57) ABSTRACT

A decentralized trust assessment system, comprising a neural network, a trust module, and a local subsystem, wherein the trust module controls whether a plurality of inputs to the local subsystem are trustworthy. The decentralized trust assessment system provides rotorcraft and tiltrotor aircraft with airborne systems able to detect bad and spoofed data from a wide variety of data streams.

20 Claims, 5 Drawing Sheets

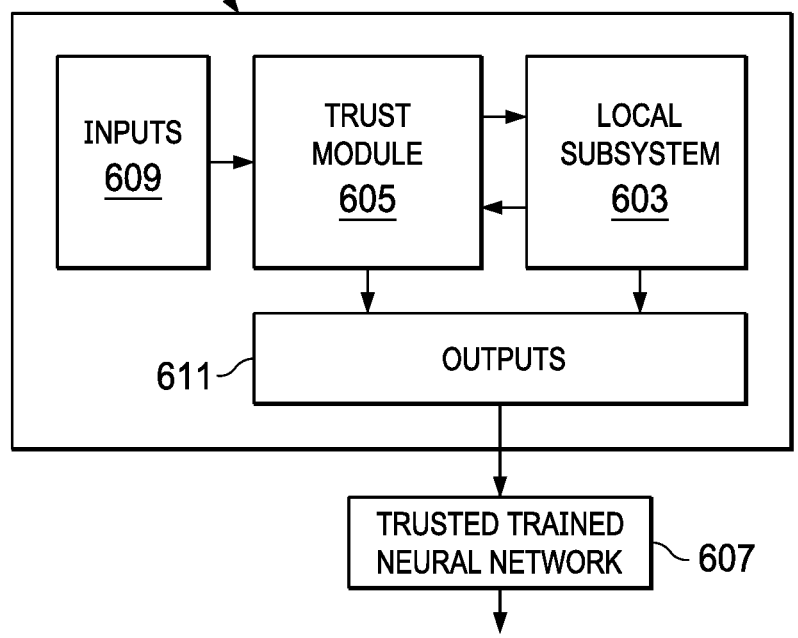
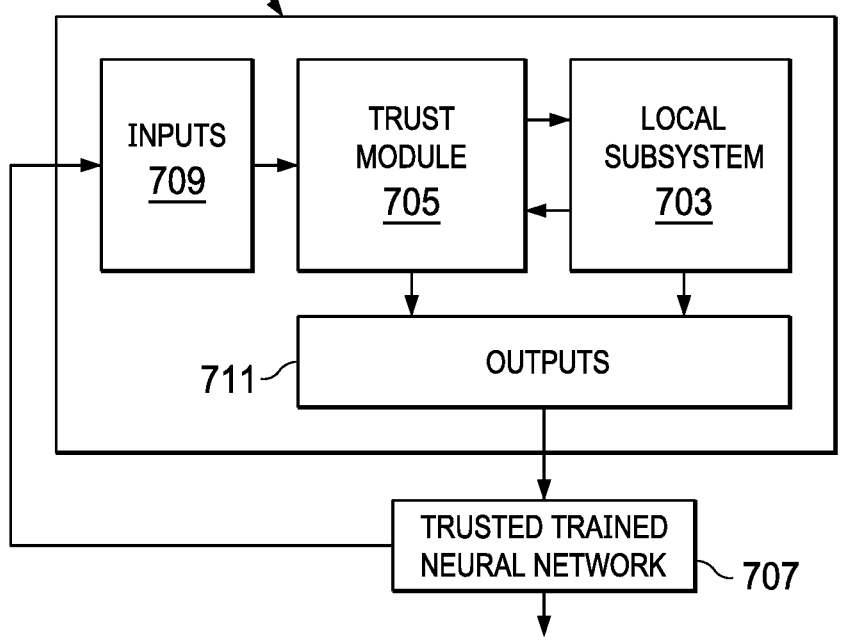

DECENTRALIZED TRUST ASSESSMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Modern day aircraft require their avionics systems to be reliable because so much of the actual control of the aircraft is done by parts of the avionics system. Some conventional avionics systems utilize only a trust assessment module. The trust assessment module is configured for accepting various input data streams and making quality determinations on those input data streams. Having only a trust assessment module limits the robustness of the system. For example, trust assessment modules look for data streams that have failed, are stuck at a value, or have reached a maximum or minimum. When the trust module has not been programmed to look for a specific condition, the trust module cannot detect it. Therefore, limitations exist in conventional trust assessment modules.

BRIEF DESCRIPTION OF THE DRAWINGS

FIG. 6 is a schematic view of a decentralized trust assessment system according to this disclosure.

FIG. 7 is a schematic view of a decentralized trust assessment system according to this disclosure.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure teaches a system comprised of trust assessment modules in conjunction with neural networks. The improved system can identify when data streams meet a predetermined condition and when the data streams have formed a pattern worth being concerned over. Those data streams include inputs to the aircraft subsystem, outputs of the aircraft subsystem, and the state of the aircraft subsystem itself. The decentralized trust assessment system (DTAS) verifies that the aircraft subsystem is receiving good data and is not being spoofed by combining a trust module with a neural network. The system further verifies that the aircraft subsystem is generating good data. The system can override the faulty subsystem and provide a better quality output data stream. The trust module in combination with the neural network verifies the format, the authenticity, and the content of the inputs to the subsystem. The trust module in combination with the neural network verifies the subsystem behavior is appropriate. Neural networks do not require specific preprogramming to detect bad streams of data, however, their detection of bad streams of data is not absolute. Trust modules do require specific programming to detect bad streams of data, however, they cannot detect what they are not programmed for. Trust modules also can be a software component that is executed either within a processor of the subsystem or physically separate from it. Combining the two elements results in a superior airborne DTAS.

Figure 1:
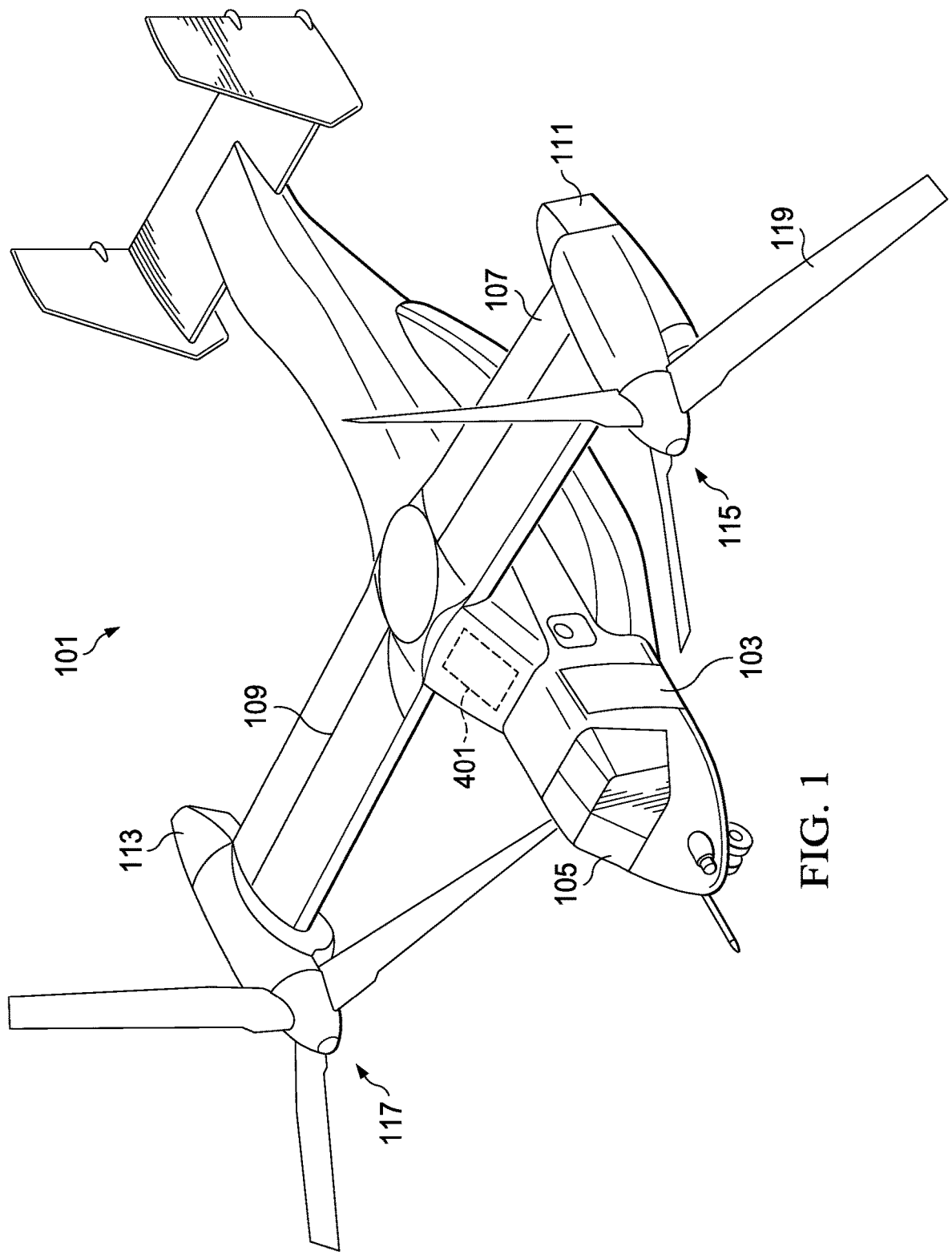
FIG. 1 is an oblique view of a tiltrotor aircraft according to this disclosure.

FIG. 1 illustrates a tiltrotor aircraft 101 equipped with a decentralized trust assessment system (DTAS) 401 according to this disclosure. Aircraft 101 has a fuselage 103 with a cockpit 105 located in a forward portion of fuselage 103. Wings 107, 109 are attached to fuselage 103, and an engine nacelle 111, 113 is rotatably attached to the outer end of each wing 107, 109, respectively. Each nacelle 111, 113 houses an engine (not shown), which is operably connected to a rotatable proprotor 115, 117. Each proprotor 115, 117 comprises three blades 119. Proprotors 115, 117 rotate in opposite directions and comprise similar components, though components in proprotors 115, 117 may be constructed and/or installed in a mirror, or reverse, manner from the opposite proprotor 115, 117. Aircraft 101 requires a plurality of flight control computers in conjunction with pilot inputs to fly the aircraft. Flight control computers rely on various sensors, such as pitot static airspeed, gyroscopes, global positioning sensors, accelerometers, thermocouples, etc. for providing conditional information to the flight control computers. An example is the flight control computer's use of airspeed to vary the speed of proprotors 115,117. The airspeed system is verified by the DTAS 401 before the airspeed data is passed to the flight control computers. Therefore, the flight control computer can operate with a higher level of data confidence.

Figure 2:
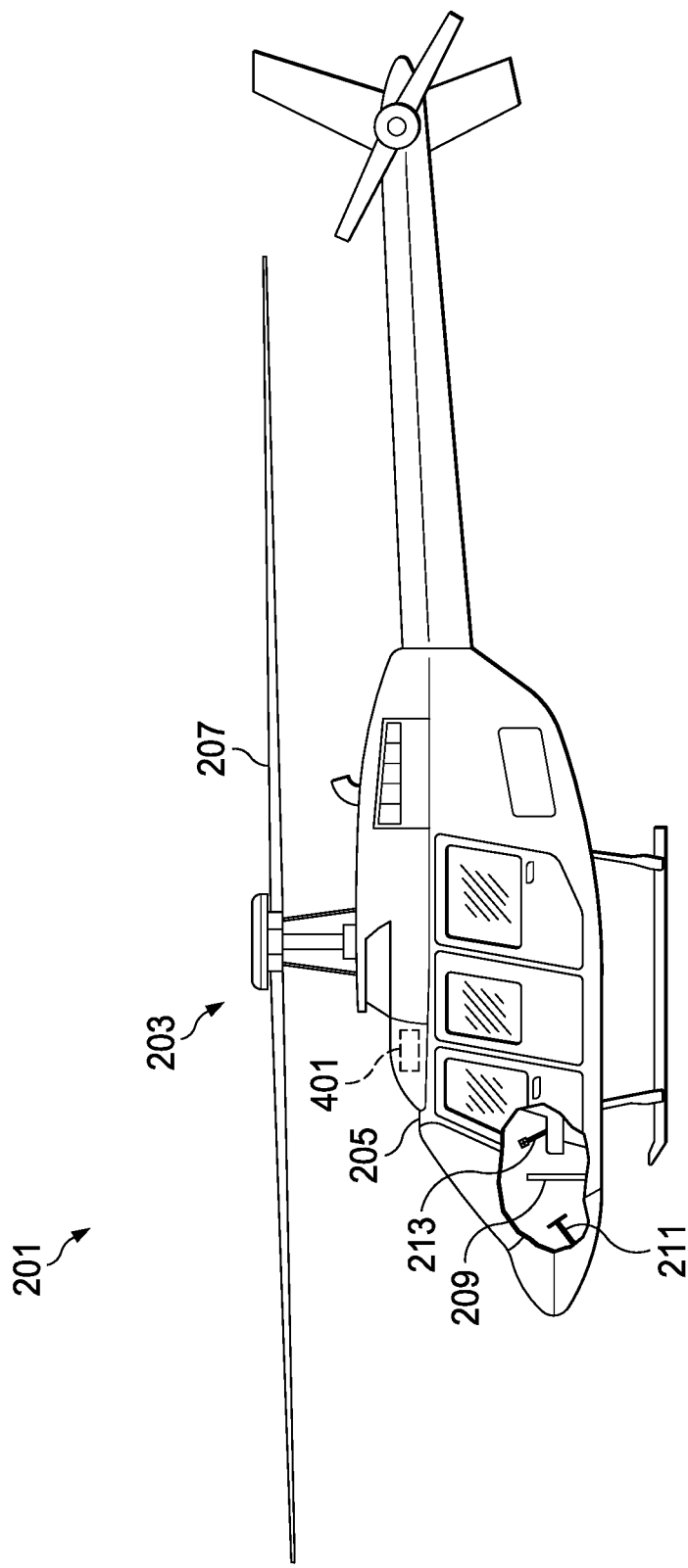
FIG. 2 is a side view of a rotorcraft according to this disclosure.

FIG. 2 illustrates a rotorcraft 201 equipped with a decentralized trust assessment system (DTAS) 401 according to this disclosure. Rotorcraft 201 comprises a rotary system 203 carried by a fuselage 205. One or more rotor blades 207 operably associated with rotor system 203 provide flight for rotorcraft 201 and are controlled with a plurality of control sticks within fuselage 205 feeding inputs into a flight control computer. For example, during flight a pilot can manipulate the cyclic stick 209 to change the pitch angle of rotor blades 207, thus providing lateral and longitudinal flight direction, and/or manipulate pedals 211 for controlling yaw direction, furthermore the pilot can adjust the collective stick 213 to change the pitch angles of all of the rotor blades concurrently. The sticks and pedal movements are measured by potentiometer systems. The potentiometer systems feature a portion of the DTAS 401 and determine whether the data from the potentiometers is trusted. That trusted data is then provided to a flight control system having a portion of the DTAS 401.

Figure 3A:
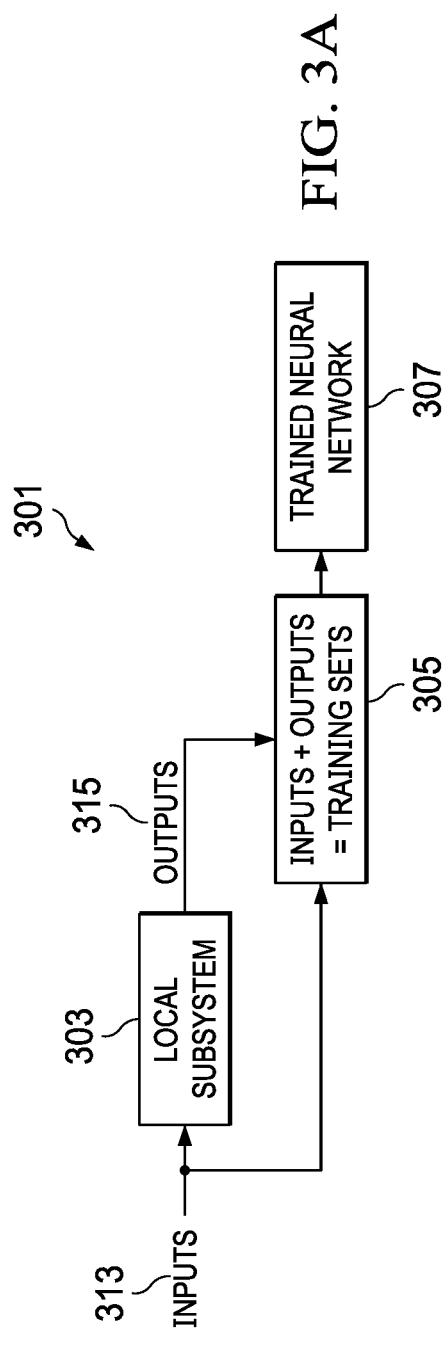
FIGS. 3A and 3B are schematic views of a decentralized trust assessment system according to this disclosure.

FIG. 3A illustrates an untrusted training system 301 for a neural network of a decentralized trust assessment system (DTAS). Untrusted training system 301 is comprised of a subsystem 303, a plurality of untrusted training sets 305, and a trained neural network 307.

The plurality of untrusted training sets 305 is comprised of a summation of inputs to the subsystem 313 and outputs of the subsystem 315. The plurality of untrusted training sets 305 are provided repetitively to the trained neural network 307. The neural network reviews the plurality of untrusted training sets 305 learning to detect patterns in the plurality of untrusted training sets. For example, a swashplate actuator's control signal and a collective position signal can be inputs to the untrusted training system 301. Conventionally the subsystem might analyze the swashplate actuator's control signal and the collective position signal to check if the signals are hitting any maximums or minimums. The trained neural network 307 can analyze the signals to find a pattern where an amplitude of the collective position signal is decreasing while the swashplate actuator's control signal is increasing, thereby indicating an issue.

Figure 3B:
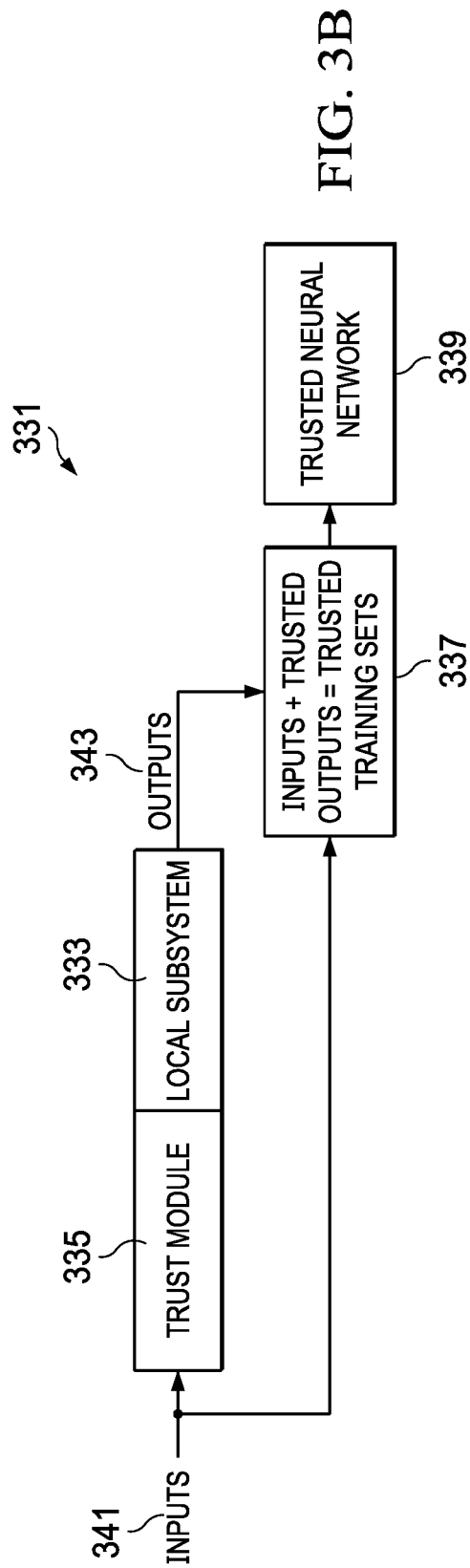

FIG. 3B illustrates a trusted training system 331 for a neural network of a DTAS. Untrusted training system 331 is comprised of a subsystem 333, a trust module 335, a plurality of trusted training sets 337, and a trusted trained neural network 339.

The plurality of untrusted training sets 337 is comprised of a summation of inputs to the subsystem 341 and outputs of the subsystem 343. The plurality of trusted training sets 337 are provided repetitively to the trusted trained neural network 339. The neural network reviews the plurality of trusted training sets 337 learning to detect patterns in the plurality of trusted training sets. For example, a trusted neural network can be developed for icing systems while the aircraft is completing icing testing.

The trust module 335 adds additional confidence in the trusted trained neural network 339 because the trust module reviews incoming data streams into the local subsystem to validate the quality of the incoming data streams. For example, local subsystem 333 is responsible for activation of an icing system to heat the wing upon accumulation of ice on the leading edges of the wings and the rotors. The trust module 335 is typically a preprocessor that ensures data and control signals are being processed within a set of bounds and within a set of expectations. Trust module 335 can be programmed to look at various thermocouples located across the wing. The trust module 335 utilizes elements such as neural network 339, decision trees, artificial and machine intelligence methods, bounds checking, and other techniques rooted in software, firmware, and/or hardware to verify the incoming inputs and the provided inputs. Trust module 335 detects when any of those thermocouples are reporting an impossible or unlikely temperature, such as absolute zero, and in response the trust module can flag the thermocouple data as bad or questionable. Therefore, the local subsystem 333 will not use the failed thermocouple data. Trusted trained neural network 339 might detect that as thermocouples are failing, their outputs ramp down to absolute zero over a period of time. Together the trust module 335 and the trusted trained neural network 339 collectively work to detect failing sensors and failed sensors by the data they generate.

Figure 4:
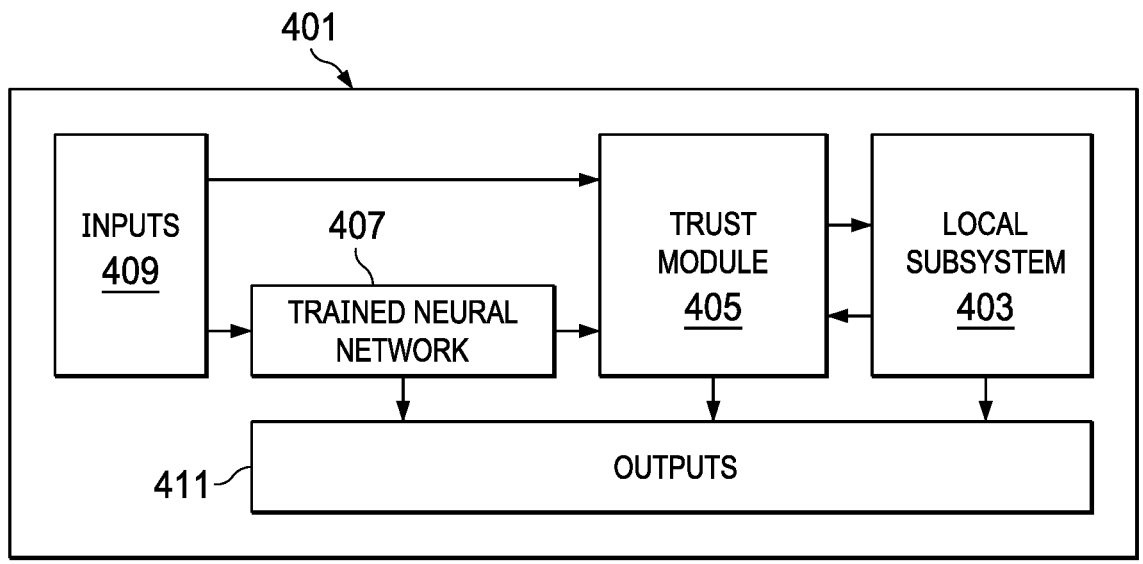
FIG. 4 is a schematic view of a decentralized trust assessment system according to this disclosure.

FIG. 4 illustrates a decentralized trust assessment system (DTAS) 401. DTAS 401 is comprised of a subsystem 403, a trust module 405, a trained neural network 407, a set of inputs 409, and a set of outputs 411. Once a trusted neural network is trained as described above, it can be utilized in conjunction with a trust module to increase the reliability of various airborne systems on a rotorcraft or tiltrotor aircraft.

The set of input data 409 is provided to both the trained neural network 407 and the trust module 405 for data quality reviews. The trust module 405 reviews the set of input data 409 for specific programmed elements such as data streams indicating maximums or minimums. The trained neural network 407 also reviews the set of input data 409 for pattern detection based upon the training of the trained neural network 407. An output of the trained neural network 407 is provided to the trust module 405 to provide increased confidence in the trust module's assessment of a quality of the set of input data 409. Local subsystem 403 operates based upon the trust module's 405 output and also provides data to the trust module 405 for consistency. Outputs of the trained neural network 407, the trust module 405, and the local subsystem 403 form the set of output data 411.

An example of the DTAS 401 uses accelerometers from a tilt-axis gearbox of a tiltrotor. Data streams from a plurality of accelerometers are fed to both the trained neural network 407 and the trust module 405. The trust module 405 detects accelerometers that have failed or are providing data outside a predetermined max window. The trained neural network 407 spots when spectral patterns of the plurality of accelerometers are diverging away from each other, thereby indicating a failing gearbox. The outputs from the trust module 405 and the trained neural network 407 are provided to local subsystem 403, for example, a gearbox monitoring system, to indicate a worn tilt-axis gearbox.

Figure 5:
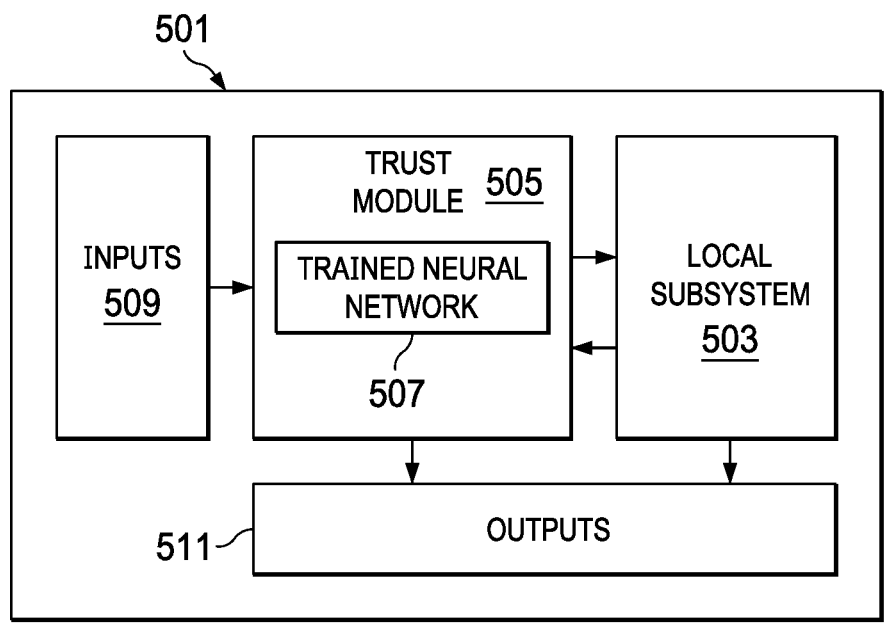
FIG. 5 is a schematic view of a decentralized trust assessment system according to this disclosure.

FIG. 5 illustrates a decentralized trust assessment system (DTAS) 501. DTAS 501 is comprised of a subsystem 503, a trust module 505, a trained neural network 507 located in the trust module 505, a set of inputs 509, and a set of outputs 511. Once a trusted neural network is trained as described above, it can be utilized inside trust module 505 to increase the reliability of various airborne systems on a rotorcraft or tiltrotor aircraft.

The set of input data 509 is provided to the trust module 505 with the trained neural network 507 located inside the trust module 505 for data quality reviews. The trust module 505 reviews the set of input data 509 for specific programmed elements such as data streams indicating maximums or minimums. The trained neural network 507 also reviews the set of input data 509 for pattern detection based upon the training of the neural network. Local subsystem 503 operates based upon the trust module's 505 output and also provides data to the trust module 505 for consistency. All outputs of the trust module 505 and the local subsystem 503 form the set of outputs 511.

An example of the DTAS 501 uses for example, Aeronautical Radio, Incorporated (ARNIC) data from a flight control computer. Data streams from the flight control computer are fed to the trust module 505. The trust module 505 detects bus channels that have failed or are providing data outside a predetermined max window. The trained neural network 507 located in the trust module 505 can spot when odd-numbered bus channels are cycling from min to max indicating a databus issue. The outputs from the trust module 505 are provided to local subsystem 403, and indicate a bad or faulty ARNIC standard 429 data bus.

FIG. 6 illustrates an alternative decentralized trust assessment system (DTAS) 601. DTAS 601 is comprised of a subsystem 603, a trust module 605, a trusted trained neural network 607 located outside both the subsystem 603 and the trust module 605, a set of inputs 609, and a set of outputs 611. Once a trusted neural network is trained as described above it can be utilized to increase the reliability of various airborne systems on a rotorcraft or tiltrotor aircraft.

The set of input data 609 is provided to the trust module 605 for data quality reviews. The trust module 605 reviews the set of input data 609 for specific programmed elements such as data streams indicating maximums or minimums. Local subsystem 603 operates based upon the trust module's 605 output and also provides data to the trust module 605 for consistency. All outputs of the trust module 605 and the local subsystem 603 form the set of outputs 611. The set of outputs 611 are fed into the trained neural network 607 for pattern detection based upon the training of the neural network.

FIG. 7 illustrates another alternative decentralized trust assessment system (DTAS) 701. DTAS 701 is comprised of a subsystem 703, a trust module 705, a trusted trained neural network 707 located outside the subsystem 703 and the trust module 705, a set of inputs 709, and a set of outputs 711. Once a trusted neural network 707 is trained as described above it can be utilized to increase the reliability of various airborne systems on a rotorcraft or tiltrotor aircraft.

The set of input data 709 are provided to the trust module 705 for data quality reviews. The trust module 705 reviews the set of input data 709 for specific programmed elements such as data streams indicating maximums or minimums. Local subsystem 703 operates based upon the trust module's 705 output and also provides data to the trust module 705 for consistency. All outputs of the trust module 705 and the local subsystem 703 form the set of outputs 711. The set of outputs 711 are fed into the trained neural network 707 for pattern detection based upon the training of the neural network. An output of the neural network is fed back into the set of inputs 709 and provides feedback to the local subsystem 703.

It should be noted that the decentralized trust assessment system described above increases the reliability of airborne systems located on aircraft and rotorcrafts. Neural networks alone increase the robustness of the aircraft by allowing pattern recognition to occur without specific programming to identify the pattern. Neural networks in conjunction with trust modules are combined to increase the robustness of the aircraft by allowing pattern recognition without specific programming and allowing the aircraft to detect bad data streams from failed systems and spoofing and allow the aircraft to deem sources trustworthy.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A decentralized trust assessment system, comprising:
    a data bus comprising at least one bus channel;
    a flight control computer configured to receive information from the data bus;
    a neural network;
    a trust module; and
    a local subsystem;
    wherein the trust module controls whether a plurality of inputs to the local subsystem are trustworthy as a function of at least one of (1) detecting a failure of the at least one bus channel, (2) detecting that the at least one bus channel is providing data outside a predetermined max window, and (3) identifying an occurrence of an odd-numbered bus channel cycling between a minimum value and maximum value.

2. The decentralized trust assessment system of claim 1, wherein the neural network is located between the plurality of inputs and the trust module.

3. The decentralized trust assessment system of claim 1, wherein the neural network is located inside the trust module.

4. The decentralized trust assessment system of claim 1, further comprising:
    a plurality of outputs from the local subsystem and the trust module;
    wherein the neural network is provided the plurality of outputs.

5. The decentralized trust assessment system of claim 4, wherein the neural network provides feedback to the trust module through the plurality of inputs.

6. The decentralized trust assessment system of claim 1, wherein the neural network is based upon a training set.

7. The decentralized trust assessment system of claim 1, wherein the neural network is based upon a trusted training set.

8. A method of decentralizing trust assessments, comprising:
    training a neural network to create a trained neural network;
    programming a trust module to review a data stream for a condition;
    reviewing the data stream with the trust module for the condition; and
    analyzing the data stream for a pattern with the trained neural network
    wherein the condition comprises at least one of (1) detecting a failure of a bus channel in communication with a flight control computer, (2) detecting that the bus channel is providing data outside a predetermined max window, and (3) identifying an occurrence of an odd-numbered bus channel cycling between a minimum value and maximum value.

9. The method of claim 8, further comprising:
flagging the data stream if the condition is met.

10. The method of claim 8, further comprising:
flagging the data stream if the pattern is detected by the trained neural network.

11. The method of claim 8, the step of training comprising:
summing the data stream before and after a local subsystem.

12. The method of claim 8, the step of training comprising:
summing the data stream before and after a local subsystem in combination with the trust module.

13. The method of claim 8, wherein the step of analyzing the data stream for a pattern with the trained neural network occurs before the step of reviewing the data stream with the trust module for the condition.

14. The method of claim 8, wherein the step of analyzing the data stream for a pattern with the trained neural network occurs after the step of reviewing the data stream with the trust module for the condition.

15. A decentralized trust assessment system of an aircraft, comprising:
a data bus comprising at least one bus channel;
a flight control computer configured to receive information from the data bus;
at least one input data stream from the flight control computer;
a local subsystem in the aircraft, the local subsystem configured to act upon the at least one input data stream;
a trained neural network; and
a trust module configured to analyze the at least one input data stream;
wherein the trust module controls whether the at least one input data stream to the local subsystem is acted upon by the local subsystem; and
wherein the trust module makes the determination as a function of data of the input data stream as a function of at least one of (1) detecting a failure of the at least one bus channel, (2) detecting that the at least one bus channel is providing data outside a predetermined max window, and (3) identifying an occurrence of an odd-numbered bus channel cycling between a minimum value and maximum value.

16. The decentralized trust assessment system of claim 15, wherein the trained neural network is located between the at least one input data stream and the trust module.

17. The decentralized trust assessment system of claim 15, wherein the trained neural network is located inside the trust module.

18. The decentralized trust assessment system of claim 15, further comprising:
at least a first output of the local subsystem and of the trust module;
wherein the trained neural network reviews the at least a first output.

19. The decentralized trust assessment system of claim 18, wherein the trained neural network provides feedback to the trust module.

20. The decentralized trust assessment system of claim 19, wherein the trust module replaces the first output based on the trained neural network.

\* \* \* \* \*